Dec. 6, 1966 C. C. TYER, JR 3,289,686
PRESSURE OR TEMPERATURE RESPONSIVE RELIEF VALVE
Filed Nov. 15, 1963
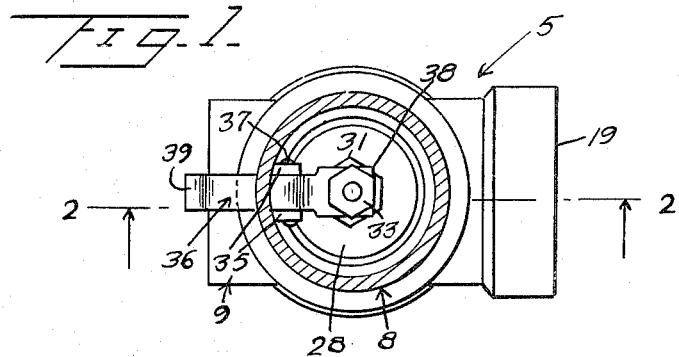
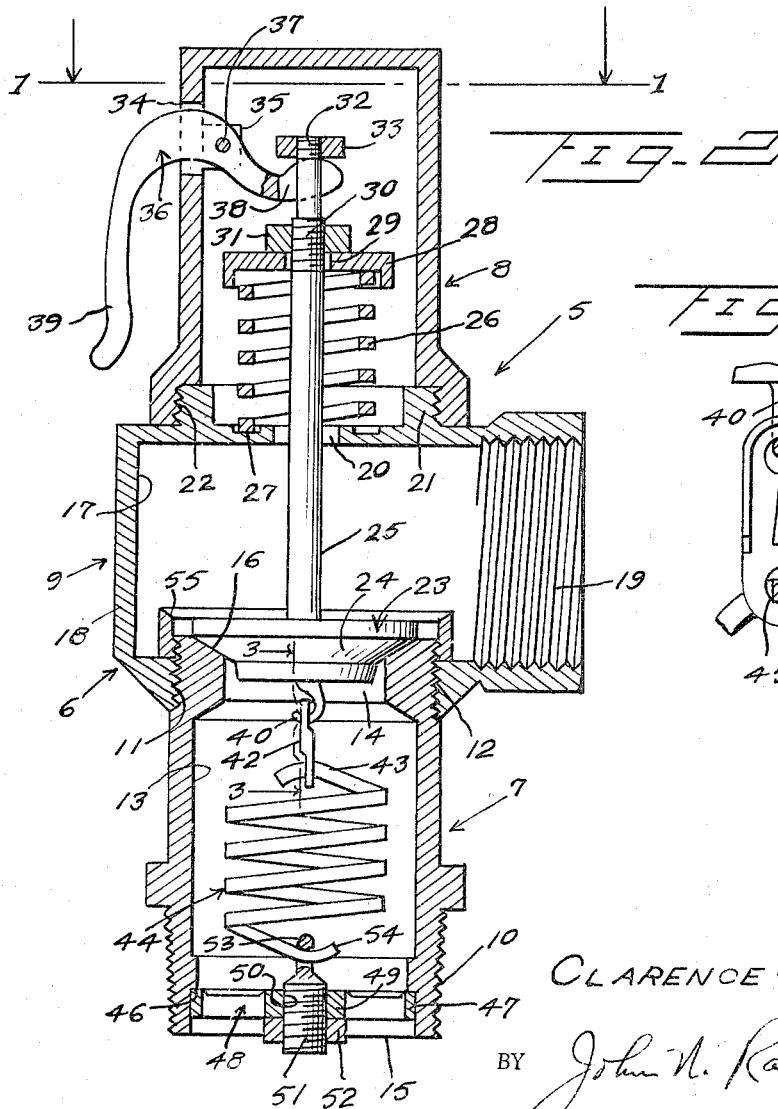
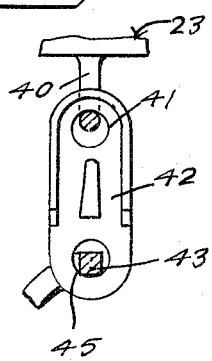
INVENTOR
CLARENCE C. TYER, JR.
BY John N. Randolph
ATTORNEY

United States Patent Office 3,289,686
Patented Dec. 6, 1966

3,289,686
PRESSURE OR TEMPERATURE RESPONSIVE RELIEF VALVE
Clarence C. Tyer, Jr., 4233 Prospect Drive, Carmichael, Calif.
Filed Nov. 15, 1963, Ser. No. 324,063
3 Claims. (Cl. 137—73)

This invention relates to a relief valve capable of being opened in response to either a predetermined pressure or a predetermined temperature.

More specifically, it is an object of the present invention to provide a relief valve which will be positively moved to a fully opened position when released in response to a predetermined temperature.

A further object of the invention is to provide a relief valve of the aforedescribed character of extremely simple construction which may be very economically produced, which will be extremely efficient in use, and which can be readily set, reset and adjusted.

Various other objects and advantages of the invention will hereinafter become more fully apparent from the following description of the drawing, illustrating a presently preferred embodiment thereof, and wherein:

FIGURE 1 is a horizontal or cross sectional view of the relief valve, taken substantially along a plane as indicated by the line 1—1 of FIGURE 2;

FIGURE 2 is an enlarged longitudinal, substantially central sectional view taken substantially along the line 2—2 of FIGURE 1, and FIGURE 3 is an enlarged fragmentary longitudinal sectional view taken substantially along the line 3—3 of FIGURE 2.

Referring more specifically to the drawing, the relief valve in its entirety is designated generally 5 and includes a housing, designated generally 6, composed of end sections 7 and 8 and an intermediate section 9.

The end section 7 constitutes the inlet section of the housing 6 and comprises a tubular body or pipe having an externally threaded outer end 10 which may engage through an opening of a boiler casing, not shown, or other pressure containing receptacle or chamber with which the valve is to function. The intermediate section 9 is disposed crosswise of the end sections 7 and 8 and has an internally threaded opening 11 disposed transversely thereof in which the other externally threaded inner end 12 of the inlet section 7 engages.

The tubular section 7 has a bore 13 which extends from end-to-end therethrough and which includes a restricted bore portion 14 which is disposed remote from the outer inlet end 15 of said bore 13. The bore 13 is flared beyond its restricted portion 14 to define an annular beveled valve seat 16, constituting the outlet end of said bore 13, and which opens into a chamber 17 of the intermediate housing section 9.

The intermediate section 9 is closed at one end by an end wall 18 and has an internally threaded open opposite end 19 constituting the outlet of the valve housing 6, and to which any suitable outlet conduit, not shown, may be connected. Accordingly the valve seat 16 is disposed between the inlet 15 and the outlet 19 of the housing 6. The intermediate section 9 has a restricted opening 20 which is disposed in axial alignment with the inlet section 7. An annular externally threaded flange 21 is formed externally on the section 9 and concentrically around the opening 20 to threadedly receive the internally threaded open end 22 of the other end section 8 which forms a hood.

A valve 23 has an annular beveled surface 24 which is shaped to conformably seat on the valve seat 16. A stem 25 projects from one side of the valve 23 across the chamber 17, through the opening 20 and partially through the section or hood 8. A compression spring 26 is disposed within the hood 8 around the valve stem 25 and has one end seating in a groove 27 in the exterior of the section 9, which surrounds the opening 20 and is surrounded by the flange or boss 21. The other end of the spring 26 seats in a cap 28 which is disposed in the hood 8 and has a central opening 29 through which the valve stem 25 extends, and which is sufficiently large to allow free sliding movement of the cap on said valve stem. The valve stem 25 has a threaded portion 30 which extends through the opening 29 and which is engaged by a nut 31 which bears on the outer side of the cap 28. The valve stem 25 terminates in a threaded distal end portion 32 which is spaced from the threaded portion 30 and is engaged by a nut 33.

The side wall of the hood 8 has an elongated opening or slot 34 and internally disposed ears 35 which straddle said slot. A lever 36 extends through the slot 34 and between the ears 35 and is pivotally mounted on the hood 8 by a pivot pin 37 which extends therethrough and through the ears 35. The lever 36 has a bifurcated end 38 which is disposed in the hood 8 and the furcations of which straddle the part of the valve stem 25 which is disposed between its threaded portion 30 and the nut 33. The other outer end of the lever 36 constitutes a handle 39, and the slot 34 is of sufficient length to permit the lever 36 to rock to a limited extent therein about its pivot 37.

A hook 40 extends from the other side of the valve 23 into the bore 13 and engages an opening 41, as seen in FIGURE 3, in one end of a conventional fusible link 42. One end 43 of a contractile coil spring 44 engages through an opening 45 in the other end of the link 42 for thus connecting the spring 44 through the link 42 and hook 40 to the valve 23. The bore 13 is provided with an annular shoulder 46 which is disposed adjacent to and faces toward its inlet end 15 against which the rim 47 of a spider 48 abuts. The spider 48 has a centrally disposed hub 49 provided with a central opening 50 to slidably receive a threaded stem 51. A nut 52 threadedly engages the outer portion of the stem 51 and bears against the outer side of the hub 49. An eye 53 projects from the inner end of the stem 51 to receive the other end 54 of the spring 44 which is thus adjutsably anchored by the stem 51 and nut 52 to the spider 48.

The spring 44 is stronger than the spring 26. That is, the nuts 52 and 31 may be adjusted so that the spring 44 exerts a greater pull on the valve 23 than the spring 26. For example, said nuts may be adjusted so that a fifteen pound pressure is necessary in the bore 13 to overcome the tension of the spring 44 and unseat the valve 23 to allow this excess pressure to escape from the inlet section 7 into the chamber 17 of the section 9 from which the pressure is released through the outlet 19. A part of the threaded portion 12 extends into the chamber 17 and is engaged by a conventional blast ring 55, which is disposed around and spaced from the valve 23 to avoid vibration and chattering of the valve as it returns to a closed position after relieving. It will also be apparent that the valve can be manually opened by pressing downwardly and inwardly on the handle 39 for rocking the lever 36 about its pivot 37 to cause the bifurcated portion 38, which bears against the underside of the nut 33, to be swung upwardly for exerting a pull on the valve stem 25 to open the valve 23 against the tension of the spring 44.

Should an excess temperature of the order of 200° F., for example, occur in the bore 13, the link 42 will be caused thereby to fuse and part thereby releasing the valve 23 from the spring 44 so that the compression spring 26 can forcibly move the valve 23 to a fully open position to enable the relief valve 5 to relieve at full capacity when actuated by an excessive temperature. When the valve 5 relieves due to an excessive temperature, the valve housing 6 is disconnected from the boiler or boiler piping, not shown, so that a new fusible link 42 can be installed. This is desirable since an excess temperature causing parting of the link 42 indicates a serious malfunctioning in the system which must be corrected.

It will be understood that the manual release lever 36 may be omitted. Furthermore, the specific arrangement of the springs as illustrated and heretofore described may vary, so long as the springs are disposed on opposite sides of the valve and the stronger spring urges the valve to a closed position.

Various other modifications and changes are contemplated and may be resorted to, without departing from the function or scope of the invention as hereinafter defined by the appended claims.

I claim as my invention:

1. A pressure or temperature responsive relief valve comprising a valve housing having an inlet and an outlet, said housing containing a valve seat interposed between said inlet and outlet, a valve engaging said valve seat for closing the passage between the inlet and outlet, a first spring disposed on one side of and connected to said valve and urging the valve to an open position, and a second stronger spring connected to and disposed on the opposite side of said valve and normally retaining the valve in a closed position, said valve opening away from the inlet and a temperature responsive element disposed in the valve housing between the inlet and the valve and connecting said stronger spring to the valve for releasing the valve from the stronger spring in response to a predetermined temperature in the valve housing.

2. A pressure or temperature responsive relief valve comprising a valve housing having an inlet and an outlet, said housing containing a valve seat interposed between said inlet and outlet, a valve engaging said valve seat for closing the passage between the inlet and outlet, a first spring disposed on one side of and connected to said valve and urging the valve to an open position, and a second stronger spring connected to and disposed on the opposite side of said valve and normally retaining the valve in a closed position and a fusible link connected to said stronger spring and disposed in the valve housing between the inlet and valve to effect release of the valve from the action of the stronger spring in response to a predetermined temperature in the valve housing and movement of the valve to a fully open position by the action of said first mentioned spring.

3. A pressure and temperature responsive relief valve adapted to be interposed in a passage between an inlet and an outlet of the passage, a first spring acting on and urging said valve toward an open position, a second stronger spring acting on and urging the valve toward said inlet and to a closed position, and a temperature responsive element disposed in the passage between the inlet and valve for disconnecting said valve from said stronger spring in response to a predetermined temperature in the passage.

References Cited by the Examiner

UNITED STATES PATENTS

| | | | |
|---|---|---|---|
| 1,623,431 | 4/1927 | McVoy | 137—529 X |
| 1,740,421 | 12/1929 | Friedman | 137—73 X |
| 1,920,647 | 8/1933 | Lake | 137—72 |
| 2,745,628 | 5/1956 | Carlson | 251—83 |
| 2,834,372 | 5/1958 | Young | 251—83 X |
| 3,040,764 | 6/1962 | Feinberg | 137—73 |

FOREIGN PATENTS 500,420  2/1939  Great Britain.

WILLIAM F. O'DEA, *Primary Examiner.*

R. GERARD, *Assistant Examiner.*